(12) United States Patent
Lan et al.

(10) Patent No.: US 8,034,313 B2
(45) Date of Patent: Oct. 11, 2011

(54) RECOVERY METHOD OF SILICON SLURRY

(75) Inventors: Chung-Wen Lan, Taipei (TW);
Yen-Chih Lin, Taipei (TW); Teng-Yu Wang, Taipei (TW); Yi-Der Tai, Taipei (TW)

(73) Assignee: National Taiwan University (TW)

( * ) Notice: Subject to any disclaimer, the term of this patent is extended or adjusted under 35 U.S.C. 154(b) by 0 days.

(21) Appl. No.: 12/004,485

(22) Filed: Dec. 21, 2007

(65) Prior Publication Data
US 2010/0215561 A1    Aug. 26, 2010

(30) Foreign Application Priority Data
Dec. 29, 2006   (TW) .................................... 95150091

(51) Int. Cl.
*C01B 33/021*    (2006.01)

(52) U.S. Cl. ........................................ 423/349

(58) Field of Classification Search .................. None
See application file for complete search history.

(56) References Cited

U.S. PATENT DOCUMENTS
6,780,665 B2 * 8/2004 Billiet et al. .................... 438/57
* cited by examiner

*Primary Examiner* — Melvin Mayes
*Assistant Examiner* — Stefanie Cohen
(74) *Attorney, Agent, or Firm* — Baker & McKenzie LLP

(57) ABSTRACT

In slicing a crystal bar into silicon wafers, an average about 40% of silicon would be loss due to the widths of slicing wires themselves. The fact that the silicon slurry is discarded as sludge or discarded after recovering silicon carbide particles causes a large waste of cost. If the silicon slurry (40% of silicon) could be recovered as the raw material for growing silicon crystal bars, the production cost would be lowered. The recovery method of silicon slurry according to the present invention could effectively obtain silicon raw material after removing impurities, which could recover the raw material used in solar crystals, further capable of increasing the silicon crystal production and lowering the cost.

20 Claims, 3 Drawing Sheets

RECOVERY METHOD OF SILICON SLURRY

FIELD OF THE INVENTION

The present invention relates to a recovery method of silicon slurry, and more particularly, to a recovery method of silicon slurry, which recovers silicon from the silicon slurry lost in slicing a crystal bar into silicon wafers by removing the impurities from the silicon slurry.

BACKGROUND OF THE INVENTION

Accompanying with an increasing focus on renewable energy in recent years, the solar industry has grown and developed rapidly. Particularly in Taiwan, it is extremely possible that Taiwan would become the world's first photovoltaic site followed by the semiconductor, panel and diode industries through vertical integration of upstream and downstream supply. During these two years, the need for solar cells has risen considerably since renewable energy policies were motivated in every country, especially in Germany. The shipping quantity of 2005 exceeds 1 GW in a single year so that the lack of silicon raw material causes its high-rising price (above 100$/Kg at present), and this also directly impacts the development of the solar industry. Therefore, low-cost raw materials and recovery of consumed materials would play a key role in positive development of the industry and cost reduction of solar power generation. Additionally, more and more firms joined the solar industry these years in Taiwan, such that the supply of silicon raw material is unable to meet the demand.

After completing the growth of a solar silicon crystal, its crown and tail would be cut first, followed by using a diamond wheel to perform external grinding till its diameter meets the wanted size. The silicon crystal bar is fixed in the crystallographic direction through its flat, then sliced into wafers by a metal slicing wire, followed by steps of edge profiling, lapping, polishing and the like to give the required silicon wafers for IC manufacturing process. In the above process, the most easily consumable step is the slicing step, wherein an average about 40% of silicon would be loss due to the widths of slicing wires themselves (kerf loss). The silicon slurry caused by slicing is discarded as sludge, and in view of economics and costs, this would be an incredible waste. Even though diamond wheels have been replaced by wire saws to slice crystal ingots in industry, but the kerf loss is still unavoidable due to their wire width of about 150 μm. A wafer slice would approximately get one lost.

It consumes a large amount of cutting fluids and abrasive fluids in lapping and polishing a wafer. The main compositions of these cutting/abrasive slurries are water, silicon carbide abrasive particles (5-30 μm), further containing lubricating oil with chemical composition, resins for fixing crystal bars and the consumed metal of slicing wires (iron and brass as the basis). The function of water is to dilute the abrasive particles and carry away the heat generated by cutting and lapping. The key roles, which cause the cutting/abrasive action, are silicon carbide particles suspended in the slurry. The reason for selecting silicon carbide is owing to its high hardness and low price. In spite of the cheapness of silicon carbide, most people still put emphasis on recovering the silicon carbide from wasted abrasive slurry because it is used in a high volume and takes the most fraction of wasted silicon slurry. Since a large amount of abrasive fluids are utilized in lapping wafers and they cannot be recycled in order to maintain good wafer quality as well as the most portion of these abrasive fluids is silicon carbide and the silicon content is relatively low, thus the recovery of silicon carbide is more simple and beneficial than that of silicon. Moreover, in comparison with silicon powder, some silicon carbide particles have small particle sizes (about 1 micron or less) due to the particle crush by lapping. This would lead to the difficulty of separation. Additionally, the purity required for silicon raw material is very high (6-nine to 7-nine) with allowable impurity levels below 1 ppm. Therefore, the separation of silicon from silicon carbide is quite difficult in terms of technology.

SUMMARY OF THE INVENTION

In slicing a crystal bar into silicon wafers, an average about 40% of silicon would be loss due to the widths of slicing wires themselves. The fact that the silicon slurry is discarded as sludge or discarded after recovering silicon carbide particles causes a large waste of cost. If the silicon slurry (40% of silicon) could be recovered as the raw material for growing silicon crystal bars, the production cost would be lowered. The silicon slurry contains impurities such as lubricating oil or ethylene glycol, the consumed metal of slicing wires and the like, besides silicon, water and silicon carbide. In view of the foregoing, the recovery method of silicon slurry according to the present invention could effectively obtain silicon raw material after removing the above impurities, which could recover the raw material used in solar crystals, further capable of increasing the silicon crystal production.

In embodiment of the method of the present invention, the recycled silicon slurry is cleaned with a cleaner (acetone) and centrifuge treated to remove oil and grease contaminants, and a pickling agent is further added to dissolve and remove the metallic materials from the silicon slurry by acid wash, then rinsed with pure water for one time and subsequently removing organic materials and water-soluble impurities from the silicon slurry using the cleaner (acetone) and dried. At this time, only silicon and silicon carbide are left in the silicon powder, and to it is added a flotation agent with specific gravity between silicon (2.33) and silicon carbide (3.23), then separating silicon from silicon carbide via centrifugation, removing most large particles of the silicon carbide. Moreover, in consideration of the difficulty, an accumulation step of silicon carbide can be carried out for one time by adjusting its pH value and adding a coagulant to promote the accumulation of silicon carbide particles, then performing centrifugation. After drying, the silicon slurry could be dried into silicon at this time. In a further high temperature purification process, the silicon obtained thus can be heated above the melting point of silicon crystal to make the silicon crystal precipitated out and separated from the silicon carbide phase.

DETAILED DESCRIPTION OF THE PREFERRED EMBODIMENTS

Figure 1:
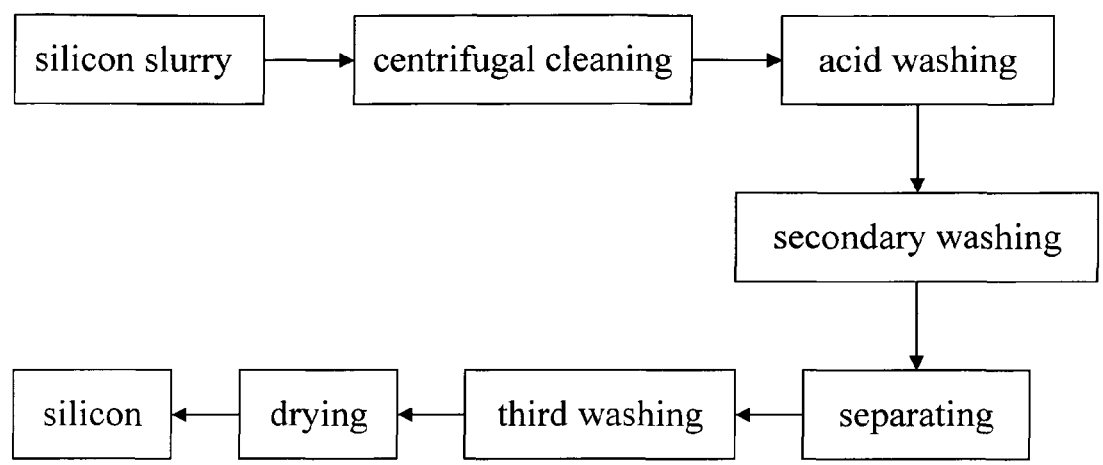
FIG. 1 is a flow chart of the main steps in the recovery method of silicon slurry according to the present invention.
Figure 2:
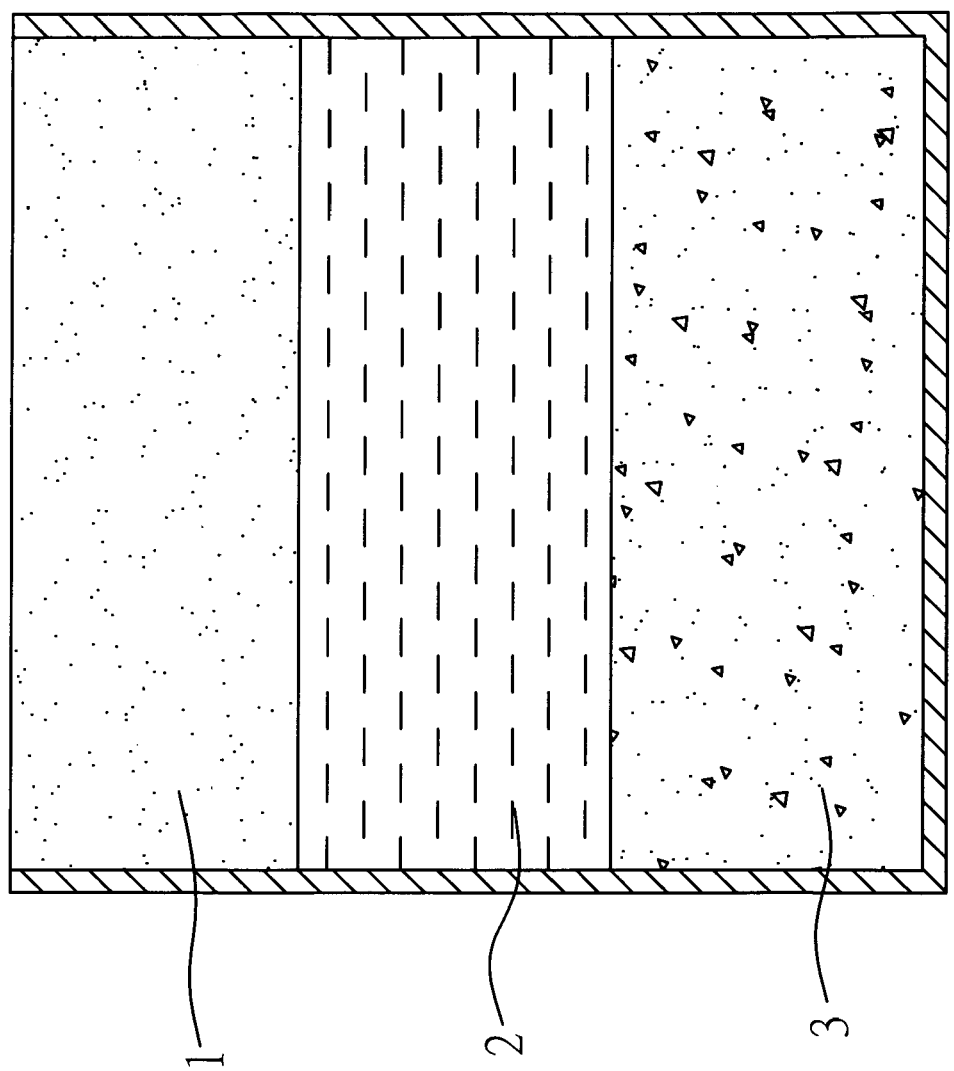
FIG. 2 is a schematic diagram of the silicon and silicon carbide suspended in $CHBr_3$ according to the present invention.

In the recovery method of silicon slurry according to the present invention, that a crystal bar can be sliced into silicon wafers by linear cutting machines or diamond emery wheels leads to form silicon slurry, whose composition varies from different cutting manners. The main composition of the silicon slurry formed by linear cutting machines includes the abraded silicon particles, the silicon carbide particles for cutting, lubricating oil or ethylene glycol, the consumed metal of slicing wires, or the unexpected contaminants in this treating process. As shown in FIG. 1, the recovery method comprising the following steps:

a. Centrifugal cleaning, in which a cleaner, such as acetone is added to remove the impurities from the silicon slurry and its liquid is separated by centrifugation. The centrifugation can be either batch or continuous type. For example, industrial disc centrifuges can be used for continuous centrifugation, so as to remove the sewage and lubricating oil. The deposited silicon slurry is obtained after centrifugation of the cleaned slurry, and the water can be removed from the turbid supernatant by distillation for the next rinse. Most of the contaminants in solution state can be removed in this step.

b. Acid washing, in this step, the silicon slurry only contains silicon carbide and silicon particles along with a lot of metal contaminants. The metal contaminants mainly come from the consumed metal of slicing wires (e.g. plating copper) and a little fraction of them is some metal ions contained in the solution of the previous cleaning step. These metal contaminants generally adsorb the surface of the silicon crystal in the form of bonding or oxides. By means of acid wash, sulfuric acid, hydrochloric acid or nitric acid reacts with the metal of the crystal surface to form soluble complexes dissolved in the solution, then filtered and rinsed to remove the metallic materials. The content of the metal contaminants in the silicon slurry is low so the cleaning acid can be reused for many times, and it does not increase the production cost too much.

c. Secondary washing for removing organic materials. The silicon slurry after acid wash still contains some organic materials. Although the content of these materials is low, they may be cracked into carbon during a heating process then embedded in the silicon crystal. Therefore, it needs to perform secondary washing with alcohols or ketones, such as ethanol and acetone, to remove organic materials completely. The residue after the filtration of this step is the desired silicon slurry, and the alcohols and ketones can be recycled after distilling the filtrate. Followed by cleaning with alcohols or ketones, the silicon slurry can be rinsed with clean water for one more time to make sure that all solvents are removed.

d. Separating. The main difference in properties between silicon and silicon carbide lies in their melting points and densities. The melting point of silicon is 1412° C., and the melting point of silicon carbide is 2545° C. Even though the mixture with such a high melting point difference could be separated by filtration after heat melting, however, this method is not suitable due to the easy oxidizability of silicon at high temperature and high cost of filtration at high temperature. Therefore, the separation is carried out in accordance with their density difference by adding a liquid with specific gravity between those two solids. The silicon is separated from the silicon carbide using a flotation agent with specific gravity about 2.8, such as bromoform ($CHBr_3$) and tetrabromoethane ($C_2H_2Br_4$), and the specific gravity of the flotation agent can be adjusted by the addition of ethanol. When mixing the silicon, silicon carbide and flotation agent into a suspension, followed by centrifugation, as referring to FIG. 2, the upper solid 1 is silicon, the lower solid 2 is silicon carbide, and the transparent liquid of intermediate layer 3 is the flotation agent. By this way, the silicon carbide can be removed; since some particles in the silicon slurry are quite small, these fine particles may be suspended in the liquid in way of emulsion or in the form of colloids and could not be precipitated. Hence, it is necessary to carry out an accumulation step of silicon carbide for one time by adding an acid/alkali solution to adjust its pH value and to prevent emulsion phenomena, or adding a coagulant and a surfactant to promote the accumulation of silicon carbide, then performing centrifugation to remove most of the silicon carbide.

e. Third washing. After removing the silicon carbide, the resulted product is washed with alcohols or ketones, and then filtered to remove the flotation agent. At this time, step c can be repeated to wash out the metal contaminants or organic materials possibly carried by the above coagulant or surfactant, if necessary.

f. Drying. The silicon slurry only contains silicon particles and water before proceeding to this step. Because silicon reacts with oxygen to form silicon dioxide, the ordinary high-temperature drying methods cannot be applied. According to the present invention, the water is removed at room temperature in way of vacuum drying, and thus a high purity silicon powder is obtained.

g. High-temperature dissociating. For the purpose of further dissociation of the silicon carbide, the dried silicon slurry could be placed in a crucible and heated above the melting point of silicon but below the melting point of silicon carbide to crystallize out the silicon crystal. The resistance of the silicon crystal thus obtained is near that of a round-sliced crystal bar, and the carrier lifetime is similar to the wafer slices.

Furthermore, a silicon dissolution step can be carried out between step b and step c by adding hydrofluoric acid for cleaning to accelerate the dissolution of silica existed in the silicon slurry. Deionized water can also be added after the third washing step to remove specific cations and anions from the water.

In the aforementioned steps, the solid silicon and silicon carbide are suspended in a flotation agent with specific gravity between both of them, and then a high gravitational field is applied to the suspension while performing centrifugation such that the silicon powder with lighter specific gravity is suspended in the upper liquid and the silicon carbide with heavier specific gravity settles to the lower liquid. Thus, the separation of the silicon carbide from the silicon powder can be achieved. However, the purity of silicon powder recovered by separation depends on the separation effect of centrifugation, so the influence of different conditions on the separation effect of centrifugation is discussed below.

1. The Influence of Solid Volume Fraction

In order to study the influence of solid volume fraction, the other variables, such as the ultrasonic vibration time, centrifugation time and centrifugal times of the experiment were kept constant, and the experiment was conducted with solid volume fractions of 6.5 and 15% to investigate how this variable acts on the separation effect. As seen in Table 1, when conducting the experiment with solid volume fraction of 6.5%, the results of the carbon contents and the recovery rates obtained were very close to each other, but when the solid volume fraction was increased to 15%, the recovery rate of the experiment began to decrease and the carbon content was thus raised. This result is attributed to that if the mode by Richardson & Zaki (1954) were applicable to this experiment, when the solid volume fraction is raised (i.e. the ø value is increased), as indicated in Table 1, the terminal velocity of particles in a liquid phase would be reduced and lower than the terminal velocity obtained from the theoretical formula. Therefore, under the condition of the same centrifugation time and centrifugal times, as the solid volume fraction gets higher, the particles move more slowly and the separation effect also gets worse. Owing to the influence of hindered settling effect, the recovery rate is also reduced by increase of the ø value.

TABLE 1 the influence of different solid volume fractions on the separation effect.

| experimental conditions | solid volume fraction (%) | ultrasonic vibration time (min) | centrifugation time (min) | centrifugal times | recovery rate (%) | carbon content (%) |
|---|---|---|---|---|---|---|
| Exp 1 | 6.5 | 60 | 60 | 5 | 81.5 | 7.1~8.1 |
| Exp 2 | 6.5 | 60 | 60 | 5 | 80.0 | 6.2~7.7 |
| Exp 3 | 15 | 60 | 60 | 5 | 76.2 | 7.9~9.5 |

2. The Influence of Ultrasonic Vibration Time

The separation system in this experiment is a kind of solid/liquid/solid separation. For separating the solids composed of two different materials from each other successfully, the key factor is whether the two kinds of powder could be completely separated or not as well as they would not adhere to each other or be agglomerated together. In general, the main function of ultrasonic wave is to provide energy for the materials to dissolve them in a liquid phase, or to enhance their micro-mixing effect in a liquid phase. However, not all materials would exhibit a better mixing effect in a liquid phase as the action time increases under ultrasonic wave, so it is attempted to observe the separation effect with different ultrasonic vibration time in this experiment and to further determine the influence of ultrasonic vibration on the mixing effect of the system.

The operating time of ultrasonic wave was set to be 20 and 60 min. and the other variables were kept constant. As seen in Table 2, when the operating time of ultrasonic wave was shortened from 60 min. to 20 min., the separation effect had been improved as well as the centrifugal times increased, the effect was more significant. The reason for this result may be that in the silicon/bromoform/silicon carbide system, the silicon and silicon carbide particles both have the size between 0.4 and 2 μm, when these fine powders suspended in the liquid, the small particles of material could be more easily aggregated due to the longer time ultrasonic wave applies the energy, so the separation effect would get worse.

TABLE 2 the influence of different ultrasonic vibration time on the separation effect.

| experimental conditions | solid volume fraction (%) | ultrasonic vibration time (min) | centrifugation time (min) | centrifugal times | carbon content (%) |
|---|---|---|---|---|---|
| Exp 4 | 6.5 | 60 | 60 | 1 | 5.3 |
|  | 6.5 | 60 | 60 | 2 | 5.2 |
|  | 6.5 | 60 | 60 | 3 | 5.2 |
| Exp 5 | 6.5 | 20 | 60 | 1 | 5.2 |
|  | 6.5 | 20 | 60 | 2 | 4.7 |
|  | 6.5 | 20 | 60 | 3 | 4.5 |

3. The Influence of Centrifugal Times

During the experiments of centrifugal separation, after the three of silicon/bromoform/silicon carbide are mixed, followed by the primary centrifugation, removal of the lower solid silicon carbide and the secondary centrifugation, there is still a little of solid silicon carbide deposited, hence repeating the centrifugation step is needed. The number of centrifugal times is also within the range discussed in this experiment. The influence of centrifugal times on separating the silicon powder is shown in Table 3. In the same experimental conditions, the carbon content of the silicon powder is reduced with increase of centrifugal times because centrifugation for each time exhibits its separation effect. In terms of this result, if it is intended to recover the silicon powder with lower carbon content, it only needs to rise centrifugal times, but the recovery rate of silicon powder goes down with increased centrifugal times. Therefore, It is not feasible to recover massive silicon powder industrially by increase of centrifugal times. On the other hand, in Table 3, when the centrifugal times is increased to 5 times, the carbon content of the recovered silicon powder is not significantly improved. According to such a result, it can be assumed that in the centrifugal system for separating silicon/bromoform/silicon carbide, the separation effect by mechanical centrifugation would reach about 2 to 3 wt % (weight percentage) of the carbon content. That is, the result should be the limit that centrifugation could achieve.

TABLE 3 the influence of different centrifugal times on the separation effect.

| experimental conditions | solid volume fraction (%) | times of 0.5 wt % hydrofluoric acid cleaning | ultrasonic vibration time (min) | centrifugation time (min) | centrifugal times | recovery rate (%) | carbon content (%) |
|---|---|---|---|---|---|---|---|
| Exp 6 | 6.5 | 3 | 60 | 60 | 1 | 87.1 | 3.9~4.6 |
| Exp 7 | 6.5 | 3 | 60 | 60 | 2 | 75.1 | 2.9~3.7 |
| Exp 8 | 6.5 | 3 | 60 | 60 | 3 | 69.2 | 2.9~3.2 |
| Exp 9 | 6.5 | 1 | 60 | 60 | 5 | 70.9 | 2.69~5.6 |

From the above three experiments, it can be found that higher solid volume fraction would lead to the slower travel speeds of particles as well as the recovery rate is also reduced with increased influence of the hindered settling effect; in the silicon/bromoform/silicon carbide system, the small particles of silicon and silicon carbide are easily aggregated under ultrasonic wave for a long time, hence the longer time of ultrasonic oscillation mixing, the more poor separation of silicon powder. It is also found that the influence of centrifugal times on the separation effect would raise the purity of silicon powder with increase of centrifugal times, but this improvement is constrained, and the recovery rate would be more reduced with increased centrifugal times.

In consideration of the purity of silicon powder and its recovery rate, the silicon powder having about 2.3% of the carbon content can be recovered with the recovery rate of 70% under the following experimental conditions: solid volume fraction=6.5%, ultrasonic vibration time=20 min., centrifugal times=3 to 4 times, centrifugation time (for each time)=60 min., concentration of hydrofluoric acid for cleaning=0.5 wt %, according to the present experimental results.

Figure 3:
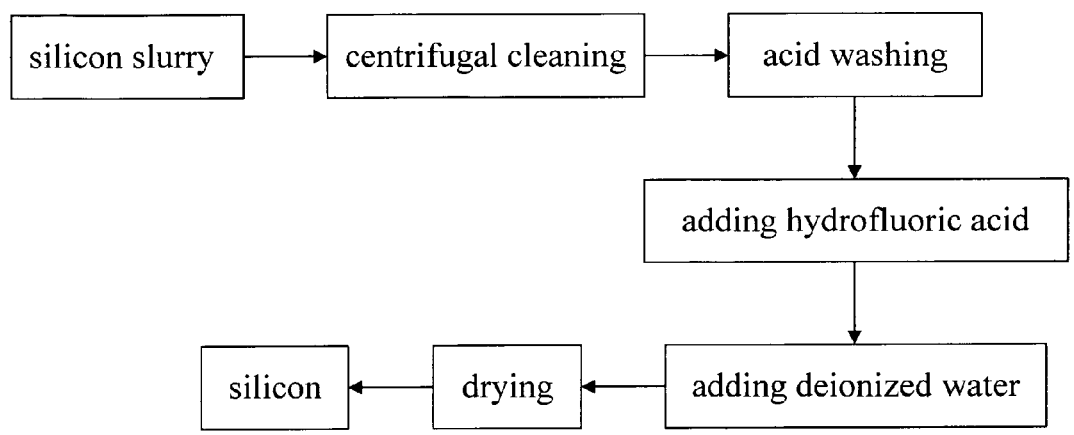
FIG. 3 is a flow chart of another step in the recovery method of silicon slurry according to the present invention.

In addition, the main composition of the silicon slurry left behind silicon wafer thinning by diamond emery wheels is silicon together with some oil and grease, trace metal and silicon oxides. As shown in FIG. 3, the recovery method comprising the following steps:
a. Centrifugal cleaning, in which a cleaner, such as acetone is added to remove the impurities from the silicon slurry and its liquid is separated by centrifugation. The centrifugation can be either batch or continuous type. For example, industrial disc centrifuges can be used for continuous centrifugation, so as to remove the sewage and lubricating oil. The deposited silicon slurry is obtained after centrifugation of the cleaned slurry, and the water can be removed from the turbid supernatant by distillation for the next rinse. Most of the contaminants in solution state can be removed in this step.
b. Acid washing, in this step, the silicon slurry only contains silicon particles along with trace metal elements and silica. The trace metal elements mainly come from the consumed metal of diamond emery wheels and a little fraction of them is some metal ions contained in the solution of the previous cleaning step. These trace metal elements generally adsorb the surface of the silicon crystal in the form of bonding or oxides. By means of acid wash, sulfuric acid, hydrochloric acid or nitric acid reacts with the metal of the crystal surface to form soluble complexes dissolved in the solution, and then the liquid is separated by centrifugation to remove the metallic materials.
c. Adding hydrofluoric acid. Cleaning by adding hydrofluoric acid is to accelerate the dissolution of silica existed in the silicon slurry.
d. Adding deionized water to remove specific cations and anions from the water
e. Drying. The silicon slurry only contains silicon particles and water before proceeding to this step. Because silicon reacts with oxygen to form silicon dioxide, the ordinary high-temperature drying methods cannot be applied. According to the present invention, the water is removed at room temperature in way of vacuum drying, and thus a high purity silicon powder is obtained.

The examples and drawings has been described above are the preferred embodiments of the present invention only, it is not intended to limit the scope of the present invention, hence all similar or equivalent changes and modifications made according to the claims and specification fall within the scope of the claims.

What is claimed is:
1. A recovery method of silicon slurry comprising steps of:
a. centrifugal cleaning, in which a cleaner is added and centrifugal separation of liquid is conducted for removing the impurities from the silicon slurry;
b. acid washing, in which a pickling agent is added to remove the metallic materials from the silicon slurry, and at this time the silicon slurry is substantially comprised of silicon and silicon carbide;
c. separating, in which a flotation agent with specific gravity between silicon and silicon carbide is added, then separating silicon from silicon carbide by means of centrifugal force and removing the silicon carbide; and d. drying, in which water and the flotation agent is removed to give silicon.
2. The recovery method of silicon slurry as described in claim,1 a wherein secondary washing step is further carried out after the acid washing step.
3. The recovery method of silicon slurry as described in claim 2, wherein organic materials are washed out by alcohols or ketones, then rinsed by clean water in the secondary washing step.
4. The recovery method silicon slurry as described in claim 3, wherein alcohol is ethanol and the ketone is acetone.
5. The recovery method of silicon slurry as described in claim 2, wherein a hydrofluoric acid cleaning step is added between the acid washing step and the secondary washing step to accelerate a dissolution of silica existing in the silicon slurry.
6. The recovery method of silicon slurry as described in claim 1, wherein the cleaner is acetone.
7. The recovery method of silicon slurry as described in claim 1, wherein the pickling agent is sulfuric acid, hydrochloric acid or nitric acid.
8. The recovery method of silicon slurry as described in claim 1, wherein the flotation agent is bromoform or tetrabromoethane.
9. The recovery method of silicon slurry as described in claim 1, wherein the specific gravity of the flotation agent is adjusted by adding ethanol.
10. The recovery method of silicon slurry as described in claim 1, wherein an accumulation step of silicone carbide is further carried out before the centrifugation in the seperating step.
11. The recovery method of silicone slurry as described in claim 10, wherein an acid/alkali solution is added to adjust the pH value for accumulating the silicon carbide in the accumulation step of silicon carbide.
12. The recovery method of silicon slurry as described in claim 10, wherein a coagulant or surfactant is added to accumulate the silicon carbide in the accumulation step of silicon carbide.
13. The recovery method of silicon slurry as described in claim 1, wherein a third washing step is further carried out after the centrifugation step in step c).
14. The recovery method of silicon slurry as described in claim 13, wherein deionized water is added after the third washing step to remove specific cations and anions from the water.
15. The recovery method of silicon slurry as described in claim 1, wherein a high temperature dissociation step is further carried out after the drying step.
16. The recovery method of silicon slurry as described in claim 1, wherein the silicon slurry is heated above the melting point of silicon but below the melting point of silicon carbide after step c).

17. The recovery method of silicon slurry as described in claim 1, wherein the drying step is carried out by way of vacuum drying.

18. A recovery method of silicon slurry comprising steps of:
   a. centrifugal cleaning, in which a cleaner is added and centrifugal separation of liquid is conducted for removing the impurities from the silicon slurry;
   b. acid washing, in which a pickling agent is added to remove the metallic materials from the silicon slurry and at this time the silicon slurry is substantially comprised of silicon and silicon carbide;
   c. adding hydrofluoric acid, in which cleaning with the addition of hydrofluoric acid accelerates a dissolution of silica existing in the silicon slurry;
   d. separating, in which a flotation agent with specific gravity between silicon and silicon carbide is added, then separating silicon from silicon carbide by means of centrifugal force and removing the silicon carbide; and d. drying, in which water and the flotation agent is removed to give silicon.
   e. drying, in which water and the flotation agent is removed to give silicon; and
   f. high-temperature dissociating, in which the silicon carbide is removed.

19. The recovery method of silicon slurry as described in claim 18, wherein the cleaner is acetone.

20. The recovery method of silicon slurry as described in claim 18, wherein deionized water is further added after adding hydrofluoric acid to remove cations and anions from the water.

* * * * *